United States Patent
Wang et al.

(10) Patent No.: US 12,072,728 B2
(45) Date of Patent: Aug. 27, 2024

(54) DEVICES, SYSTEMS, AND METHODS FOR IMPLEMENTING A REAL TIME CLOCK

(71) Applicant: Infineon Technologies AG, Neubiberg (DE)

(72) Inventors: Wei Wang, Munich (DE); Lingyun Li, Ottobrunn (DE); Mihail Jefremow, Augsburg (DE); Holger Dienst, Feldkirchen (DE); Juergen Schaefer, Oberhaching (DE); Soenke Ohls, Dreieich (DE)

(73) Assignee: Infineon Technologies AG, Neubiberg (DE)

( * ) Notice: Subject to any disclaimer, the term of this patent is extended or adjusted under 35 U.S.C. 154(b) by 124 days.

(21) Appl. No.: 17/975,661

(22) Filed: Oct. 28, 2022

(65) Prior Publication Data
US 2024/0143018 A1    May 2, 2024

(51) Int. Cl.
*G06F 1/12*    (2006.01)
*G06F 1/08*    (2006.01)

(52) U.S. Cl.
CPC . *G06F 1/08* (2013.01); *G06F 1/12* (2013.01)

(58) Field of Classification Search
CPC .................................... G06F 1/08; G06F 1/10
See application file for complete search history.

(56) References Cited

U.S. PATENT DOCUMENTS

| | | | |
|---|---|---|---|
| 11,476,804 B1* | 10/2022 | Quilligan | G05F 3/02 |
| 2007/0052565 A1* | 3/2007 | Weinstein | H03M 1/12 |
| | | | 341/144 |
| 2011/0210880 A1* | 9/2011 | Hainz | H03M 1/1225 |
| | | | 341/155 |
| 2019/0260385 A1* | 8/2019 | Niwa | H03M 1/12 |
| 2021/0383358 A1* | 12/2021 | Sinha | G06Q 20/352 |

* cited by examiner

*Primary Examiner* — Phil K Nguyen
(74) *Attorney, Agent, or Firm* — Viering, Jentschura & Partner mbB; Robert M Bilotta, Jr.

(57) ABSTRACT

A device including at least one processor, and an analog-to-digital (ADC) circuit, wherein the at least one processor is configured to generate an excitation signal and provide the excitation signal to a crystal in a pierce oscillation configuration, wherein after providing the excitation signal, the ADC circuit is configured to obtain as input a signal output from the crystal and convert the signal to a digital output; the at least one processor is configured to compare the digital output of the ADC circuit to a plurality of thresholds and based on the comparisons is further configured to drive the crystal to cause the crystal to operate as a pierce oscillator and to generate a clock signal from at least of one of the comparisons.

20 Claims, 6 Drawing Sheets

DEVICES, SYSTEMS, AND METHODS FOR IMPLEMENTING A REAL TIME CLOCK

TECHNICAL FIELD

Various embodiments generally relate to clocks including real time clocks.

BACKGROUND

Real time clocks (RTCs) such as on-chip real time clocks may be implemented with analog comparators and operated either in a parallel resonance mode (e.g., pierce oscillator configuration) or serial resonance mode. In both cases the costs for realizing such types of real time clocks may be unfavorably high.

In other cases, external RTC modules may be provided for microcontrollers, which can still be cost burdensome.

One example of a relatively inexpensive real time clock can be implemented by the device 100 of FIG. 1 which implements a pierce oscillator. The device 100 include a crystal 50 operated in a type of pierce oscillator configuration. As such, two capacitors, C1 and C2 are respectively coupled to a ports or input/outputs of the crystal 50. Further, the device includes an inverter 60, a resistive load 70, shaper 80 in parallel between the ports (50a and 50b) of the crystal 50. However, RTCs implemented with such configurations or circuitries are disadvantageous because in that they are usually not be suitable for driving real time clock microelectromechanical systems (RTC MEMS) due to differing electrical characteristics.

BRIEF DESCRIPTION OF THE DRAWINGS

In the drawings, like reference characters generally refer to the same parts throughout the different views. The drawings are not necessarily to scale; emphasis instead generally being placed upon illustrating the principles of the invention. In the following description, various embodiments of the invention are described with reference to the following drawings, in which.

DESCRIPTION

Figure 1:
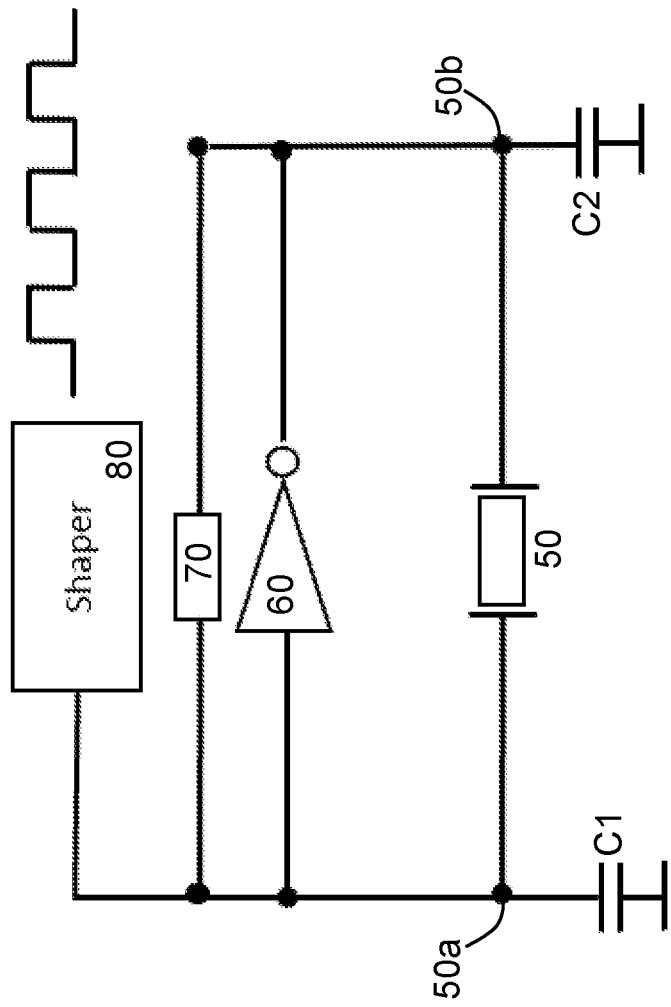
FIG. 1 include a diagram illustrating a device for implementing a pierce oscillator.

The following detailed description refers to the accompanying drawings that show, by way of illustration, specific details and embodiments in which the invention may be practiced.

The word "exemplary" is used herein to mean "serving as an example, instance, or illustration." Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set (of)", "collection (of)", "series (of)", "sequence (of)", "grouping (of)", etc., and the like in the description or in the claims refer to a quantity equal to or greater than one, i.e., one or more. Any term expressed in the plural form that does not expressly state "plurality" or "multiple" likewise refers to a quantity equal to or greater than one. The terms "proper subset", "reduced subset", and "lesser subset" refer to a subset of a set that is not equal to the set, i.e., a subset of a set that contains fewer elements than the set.

The terms "at least one" and "one or more" may be understood to include a numerical quantity greater than or equal to one (e.g., one, two, three, four, [ . . . ], etc.).

As used herein, unless otherwise specified, the use of the ordinal adjectives "first", "second", "third", etc., to describe a common object merely indicate that different instances of like objects are being referred to, and are not intended to imply that the objects so described must be in a given sequence, either temporally, spatially, in ranking, or in any other manner.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. However, the term data is not limited to the aforementioned examples and may take various forms and represent any information as understood in the art.

The term "processor" or "controller" as, for example, used herein may be understood as any kind of entity that allows handling data, signals, etc. The data, signals, etc., may be handled according to one or more specific functions executed by the processor or controller.

A processor or a controller may thus be or include an analog circuit, digital circuit, mixed-signal circuit, logic circuit, processor, microprocessor, Central Processing Unit (CPU), Neuromorphic Computing Unit (NCU), Graphics Processing Unit (GPU), Digital Signal Processor (DSP), Field-Programmable Gate Array (FPGA), integrated circuit, Application-Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, signal processor, Central Processing Unit ("CPU"), Graphics Processing Unit ("GPU"), Neuromorphic Computing Unit (NCU), Digital Signal Processor ("DSP"), Field-Programmable Gate Array ("FPGA"), integrated circuit, Application-Specific Integrated Circuit ("ASIC"), etc., or any combination thereof. Any other kind of implementation of the respective functions, which will be described below in further detail, may also be understood as a "circuit." It is understood that any two (or more) of the circuits detailed herein may be realized as a single circuit with substantially equivalent functionality. Conversely, any single circuit detailed herein may be realized as two (or more) separate circuits with substantially equivalent functionality. Additionally, references to a "circuit" may refer to two or more circuits that collectively form a single circuit.

As utilized herein, terms "module", "component", "system", "circuit", "element", "interface", "slice", "circuitry", and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more".

As used herein, a "signal" may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in a computer-readable storage medium prior to its receipt by the receiving component. The receiving component may retrieve the signal from the storage medium. Further, a "value" that is "indicative of" some quantity, state, or parameter may be physically embodied as a digital signal, an analog signal, or stored bits that encode or otherwise communicate the value.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electromagnetic wave in the other element without physical contact or intervening components. Further, when a voltage, current, or signal is referred to as being "applied" to an element, the voltage, current, or signal may be conducted to the element by way of a physical connection or by way of capacitive, electromagnetic, or inductive coupling that does not involve a physical connection.

As used herein, "memory" is understood as a non-transitory computer-readable medium where data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory and thus may refer to a collective component comprising one or more types of memory. Any single memory component may be separated into multiple collectively equivalent memory components and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

Exemplary embodiments of the present disclosure may be realized by one or more computers (e.g., computing devices/processors) reading out and executing computer-executable instructions recorded on a storage medium (e.g., non-transitory computer-readable storage medium) to perform the functions of one or more of the herein-described embodiment(s) of the disclosure. The computer(s) may comprise one or more of a central processing unit (CPU), a microprocessing unit (MPU), or other circuitry, and may include a network of separate computers or separate computer processors. The computer-executable instructions may be provided to the computer, for example, from a network or a non-volatile computer-readable storage medium. The storage medium may include, for example, one or more of a hard disk, a random-access memory (RAM), a read-only memory (ROM), a storage of distributed computing systems, an optical drive (such as a compact disc (CD), digital versatile disc (DVD), or Blu-ray Disc (BD), a flash memory device, a memory card, and the like. By way of illustration, specific details and embodiments in which the invention may be practiced.

Figure 2:
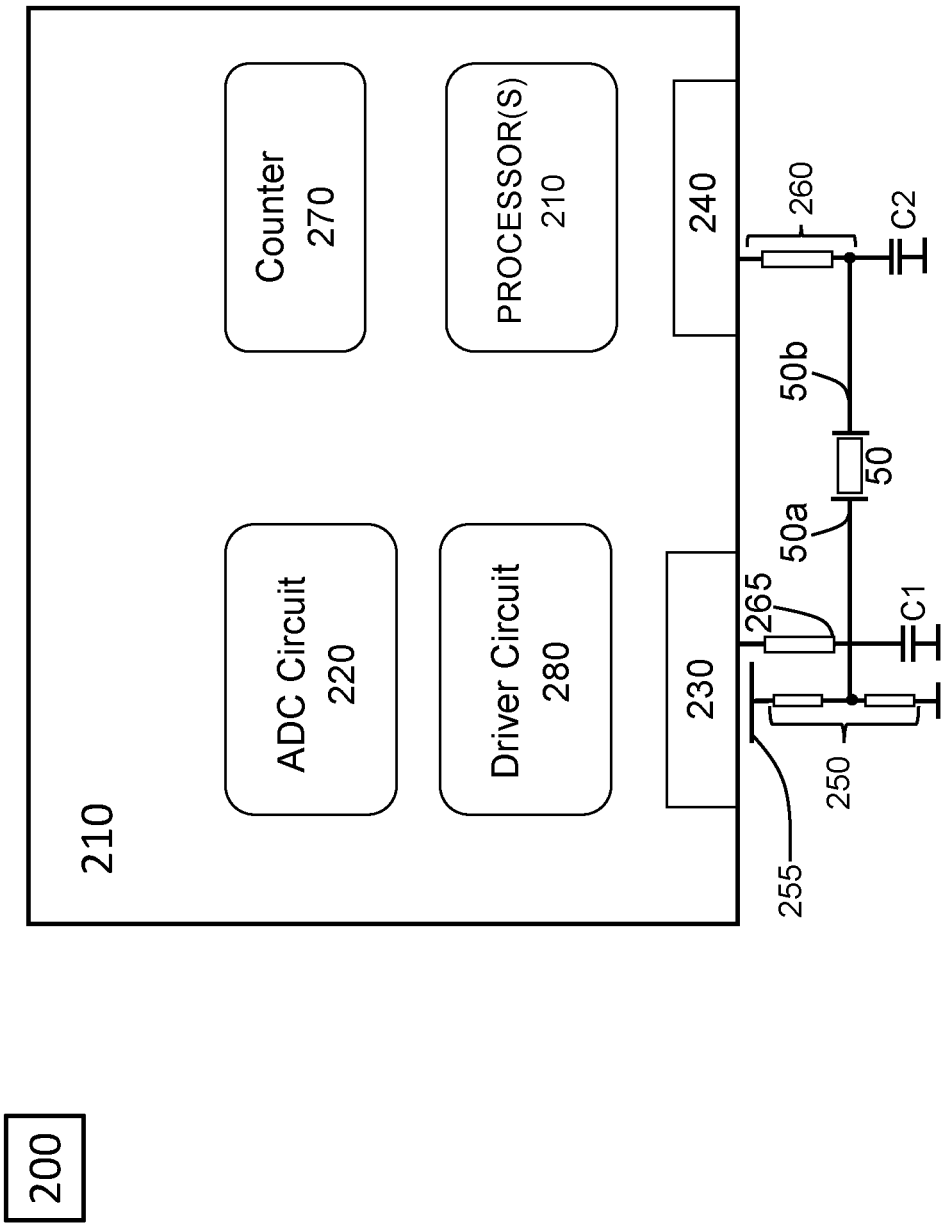
FIGS. 2-3 are diagrams of devices for implementing a real time clock (RTC) according to exemplary embodiments of the present disclosure.

FIG. 2 shows a diagram of an exemplary device 200 for implementing a real time clock (RTC). As shown in the example of FIG. 2, a microcontroller or microcontroller unit (MCU) 210 is provided. Connections between the components within the MCU 210 may be assumed although not depicted.

The MCU 210 can include one or more processors or cores 210 and an analog-to-digital converter (ADC) circuitry 220. The one or more processors or cores 210 can perform one or more operations by executing program instructions or software. Such instructions may be stored or located on a (non-transitory) computer readable storage medium (now shown), which can be located in the MCU 210.

In addition, the MCU 210 can include one or more inputs or ports. In this case, the MCU 210 includes input/output pins 230 and 240. Pin 230 and/or pin 240 can be operate in an input mode and an output mode. In one example, the MCU 210 can include circuitry (not shown) that can cause the pins 230 or pin 240 to selectively operate in an input mode (e.g., configured to accept or receive inputs/signals from external source(s)) or output mode (e.g., configured to provide output/signals to external source(s)). Such circuitry may be accessed or used by other components of the MCU 210, such as, the processors 210. In the input mode, the pins can receive signals or inputs, e.g., from external components or devices to internal components of the MCU 210. In the output mode, the input can allow outputs or signals from the MCU 210 to be transmitted from the MCU 210 to external components or devices.

In the example of FIG. 2, the crystal 50 is provided in a pierce oscillation type configuration. However, in this example the MCU 210 can function to replace or substitute for some components of the pierce oscillation configuration shown in FIG. 1, such as at least the inverter.

In FIG. 2, the crystal 50 couples to pins 230 and 240. The first port 50a of the crystal 50 couple to pin 230 of the MCU 210. The second port 50a of the crystal 50 couples to the pin 240 of the MCU 210. As shown, the crystal 50 may be further configured with and connected to a capacitor C1, which couples to the first port 50a of the crystal 50. The second capacitor C2 couple to the second port 50b of the crystal 50. The first and second capacitors C1 and C2 may each be further coupled to ground potential or another voltage potential. The capacitance of capacitors C1 and C2 may be same or in other cases have different capacitance. In one example, C1 can have a smaller capacitance than C2 for better performance. For example, capacitor C1 may have a capacitance of 15 picofarads (pF) and capacitor C2 can have a capacitance of 45 pF.

The device 200 can include a biasing circuit 250 that couples to the ADC circuit 220 and provides a bias voltage that can be used as a comparison voltage by the ADC circuit 220 in during analog-to-digital conversion operation. The biasing circuit can include a voltage source 255.

In the examples of FIG. 2 the biasing circuit 250 is external to the MCU 210 and couples through the pin 230 to the ADC circuit 220. In other examples, the biasing circuit 250 can be internal or part of the MCU 210.

In the example of FIG. 2, the biasing circuit 250 also couples to the crystal 50, e.g., to the first port 50a of the crystal 50. As shown, the biasing circuit 250 can be arranged between the MCU 210 and a voltage potential, e.g. ground potential.

In at least the example of FIG. 2, the biasing circuit 250 can be a resistive divider circuit. In other examples, the biasing circuit 250 may be realized as other suitable other types of circuit that provide the same biasing voltage function. For example, the biasing circuit 250 may be a current sink circuit including a voltage divider. The current sink circuit may be configured as a broken wire detector detection circuit.

The broken wire detection circuit can be a simple current source/sink to check if the ADC input is floating, e.g., whether an input wire is broken. When the node is floating, the current sink/source can increase or decrease the node voltage. This is a known standard functional safety feature for ADCs, also known as lead-off detection. In generally, the first port 50a of the crystal may need to be highly ohmicly biased as the comparison threshold for the ADC circuit 220.

Further in FIG. 2, the crystal 50 couples to pin 240 of the MCU 210 through an impedance circuit or driver circuit 260, e.g., for driving the crystal 50. More specifically, the second port 50b of the crystal couples to the impedance circuit 260, which is in the form of a resistive load. The impedance circuit 260 provides an impedance or impedance bias to at least the crystal 50. The impedance circuit 260 can be realized or implemented as other types of circuits or elements which also provide an impedance bias. For example, the impedance circuit 260 may be in the form of a push pull circuit with switchable resistor, an open drain circuit with pull-up resistor, or a pulse-width modulation (PWM) controlled resistor.

Further in some examples, another impedance element or circuit 265 may be coupled to the crystal 50 and MCU. As shown in FIG. 2, the impedance circuit 265 provides an impedance bias to the crystal 50 at the first port 50a. The impedance circuit 265 may be a resistor or resistive load coupled between the first port 50a of the crystal 50 and the first pin 230.

Figure 3:
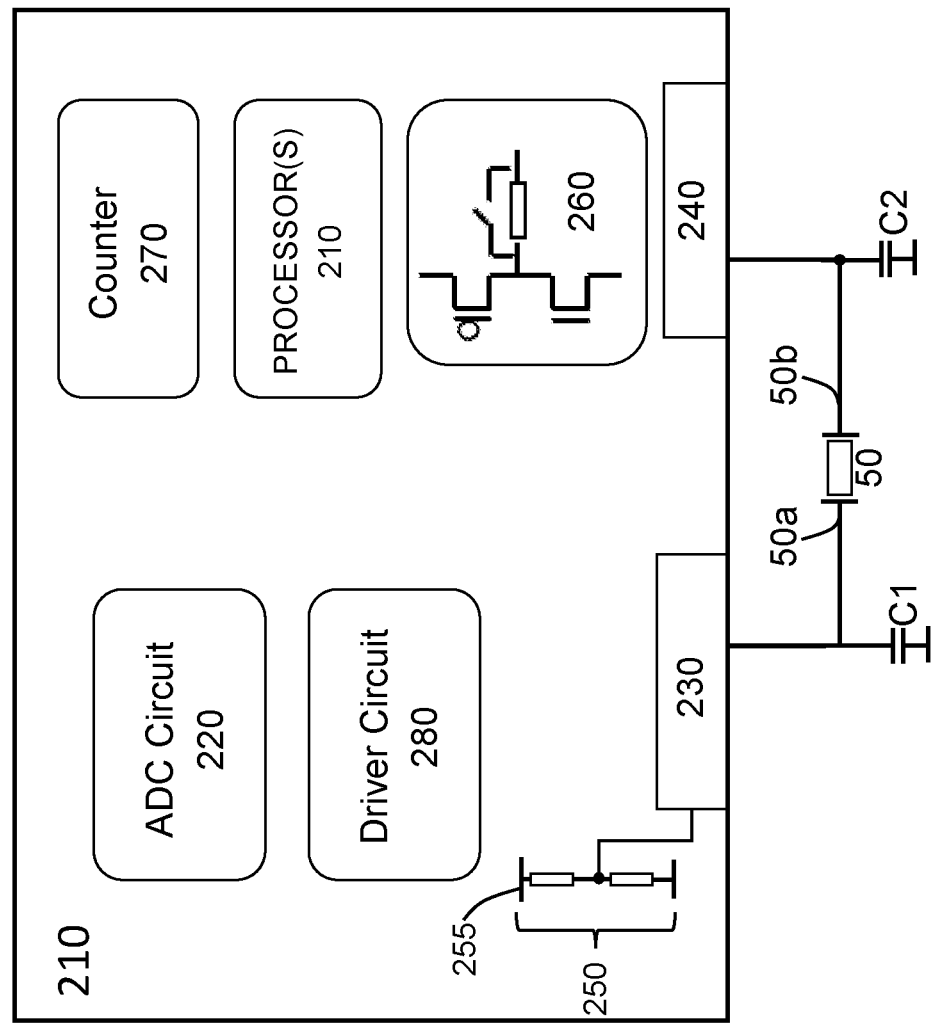

Although in FIG. 2, the bias circuit 250, impedance element/circuit 260, and impedance circuit 265 are arranged outside or external to the MCU 210, in other cases one or more of such elements may be located or arranged within the MCU 210. For example, FIG. 3 shows one instance with the bias circuit 250 and the impedance circuit 260 are arranged within the MCU 210.

According to at least one exemplary embodiment of the present disclosure, a real time clock or real time clock signal can be realized or generated after an excitation phase. This initialization phase may be implemented in response to the device 200 or MCU 210 exiting a standby phase/mode or being powering up. Specifically, the device 200 can generate the clock signal after the device 200 exits a low power mode where the MCU 210 is in a standby mode (low power mode with MCU 210 still on). Further, the real time clock signal can also be generated simply when the device and MCU are operating in normal high power operating mode.

The driver or driver circuit 280 can be a component or circuitry configured to generate signals based on inputs or signals provided thereto. In one or more examples, the driver 280 may be controlled by the one or more processors 210. The driver 280 may couple to the pin 230 and/or the pin 240.

During the excitation phase, an MCU can provide at least one excitation signal to a crystal configured or arranged in a pierce oscillation type configuration. The provided excitation signal(s) can energize and prime the crystal with sufficient energy to provide a stable oscillating signal.

Referring back to FIG. 2, the one or more processors 210 of the MCU 21- can be configured to cause the generation and provision of excitation signals. For example, the one or more processors 210 can cause the driver 280 to generate excitation signals that are provided to the crystal 50.

In some cases, the driver 280 may also be configured, based on control signals from the one or more processors 210, to drive the crystal 50 to operate as pierce oscillator as described later.

The excitation signal provided to the crystal 50 in FIG. 2 can be provided to the first port 50a of the crystal 50 via the first pin 230. In such a case, the first pin 230 operates in an output mode allowing the at least one generated excitation signal to be transmitted to the crystal 50.

Excitation signals described herein can be periodic type signals. For example, an excitation signal can be a sinusoidal signal, triangle signal, square wave signal, or combinations thereof. The excitation signals described herein can have a duty of 50% or a duty cycle of 40%-50% duty cycle.

For the implementation of RTCs in the present disclosure, the frequency or frequency range of an excitation signal can be based on characteristics and properties of the crystal used. For example, the frequency or frequencies of the generated excitation signal can be within a (predefined) range of the crystal's operating frequency or crystal frequency. In one instance, an excitation signal can have a frequency within five (5) percent of the crystal's operating frequency. In another instance, the excitation signal has a frequency within two (2) percent of a crystal's operating frequency. The excitation signal can have amplitude in a range from 100 mV-5V.

The duration of the excitation phase or the duration of when at least one excitation signal is provided to the crystal can be substantially 10 milliseconds in one case. In other cases, the duration of the excitation phase can be from 5 to 10, 5 to 20, 10-15, or 10-20 milliseconds.

In the context of FIG. 2, the excitation signal generated by the MCU 210 can be provided to the first port 50a of the crystal through the first pin 230. In such a case, the first pin 230 operates in an output mode allowing the excitation signal to be provide or transmitted to the crystal 50.

As previously stated, the excitation signal primes and energizes the crystal. As a result of this priming, the crystal 50 can be caused to rapidly produce a stable oscillating signal.

Accordingly, after the excitation phase, the crystal 50 may operate or function as an oscillator in a pierce oscillator configuration. The oscillator signals produced by the crystal 50 signals that can be used by the MCU to quickly generate an accurate RTC signal.

More specifically, after the excitation phase, the first pin 230 is connected to the ADC circuit 220 which converts the output or the signal produced from the crystal 50 into digital output or digital signal. The first pin 230, after the excitation phase, can operate in the input mode to allow the signals or output generated by the crystal 50 to be obtained by the ADC circuit 220 for conversion. For example, the crystal 50 can generate signals at the first port 50a which are then provided to the ADC circuit 220 which are then converted to digital output. The ADC circuit 220 can generate some undesired leakage current especially in high temperature, which shifts the DC voltage of the node 50a. The bias circuit 250 helps stabilize temperature and compensate the drift due to leakage.

The ADC circuits described herein, such as the ADC circuit 220 of FIG. 2 as well other examples may be a silicon controlled rectified (SCR) ADC. Further, the ADC circuits of the present disclosure may be configured to operate in a continuous mode with limit checking, which can avoid any software interaction and not use any processor resources. The ADC circuit 220 may use a low-resolution ADC, such as one having an 8 bit ADC with a resolution of 30 mV. In other cases, an ADC with a resolution of 3 mV may also be used or implemented.

The digital output produced by the ADC circuit 220 can then be further processed or used. The one or more processors 210 obtain the digital output produced by the ADC circuit 220 and compare the digital output to one or more threshold, which can be predetermined. For example, the one or more processors 210 can compare each digital output, e.g., compare each of the values of the digital signal produced by the ADC circuit 220 to an upper and a lower threshold. In at least one instance, an upper threshold may be defined or implemented as follows:

$$V_{BIAS}+V_{Offset}$$

Further, a predetermined lower threshold may be defined or implemented as follows:

$$V_{BIAS}-V_{offset}$$

where $V_{BIAS}$ is bias voltage provided by the biasing circuit, and where $V_{offset}$ is the voltage offset.

In one or more examples the voltage offset may be the voltage hysteresis of the device. In other examples, the upper and lower thresholds can be determined or set in other manners or determinations.

The retrieved signal may be used as a clock or real-time clock.

In order to continue to feed energy into the crystal to maintain oscillation, the second pin 240 and hence the second port of the crystal can be driven inversely or opposite to the output or signal produced by the signal. That is when the amplitude of the crystal output is high, the crystal is driven low, and vice versa. For example, in the case of an upper and a lower threshold, the one or more processors 210 can cause the second port of the crystal 50 to be driven with a low voltage when the digital output from the ADC circuit 220 is greater than or above the upper threshold. Further, in such an example, the one or more processors 210 can cause the second port of the crystal 50 with a high voltage when the digital output from the ADC circuit 220 is less than or below the lower threshold.

The one or more processors 210 may increment the real-time counter and generate a real-time signal based on the results of the threshold comparisons. For example, when the digital output from the ADC circuit 220 is determined to be greater than the upper threshold, the one or more processors 210 can increment a real-time counter 270 and generate a real-time clock (RTC) signal. In other instances, the one or more processors 210 may increment a real-time clock (RTC) counter 270 and also generate a real-time clock signal when the digital output from the ADC circuit 220 is determined to be below the low threshold, for example, on both the rising and falling edge.

In one or more examples, the RTC counter 270 may be a binary counter which can be used by components of the MCU 210 or other (external) devices. The counter 270 being incremented is direct clock counting, which in the present disclosure can work without an analog shaper and/or inverter.

In short, the one or more processors 210, can selectively cause a low voltage or high voltage to be applied to the crystal 50. For instance, in the context of FIG. 2, the one or more processors 210 can cause a high voltage or low voltage to be applied to the second port 50b of the crystal 50 using the impedance circuit 260. The one or more processors 210 may couple to the impedance circuit 260 through the second pin 240 to drive the second port 50b of the crystal 50.

The impedance circuit 260 may be take several forms. The impedance circuit 260 may include a resistive load (e.g., a damping resistor(s)), a push pull circuit and a switchable resistor, an open drain circuit with a pull-up resistor, or a pulse-width modulation (PWM) controlled resistor. The impedance circuit 260 may be configured to drive the crystal 50 in response to control signals from the one or more processors 210. In other cases, the driver 280 may be configured to drive the crystal 50 based on control signals from the one or more processors 210.

FIG. 3 shows another example of a device 300 for generating RTC signals. The device 300 may be the same or similar to the device 200 of FIG. 2, except where described differently in the following paragraphs.

For example, the device 300 may generally include the same components as the device 200, except now that certain components may be rearranged or repositioned differently. For example, as shown in FIG. 3, the biasing circuit 250 is arranged internally in the MCU 210. Accordingly, the biasing circuit 250 of FIG. 3 can couple to the crystal 50 through the pin 230 and can more directly couple to the ADC circuit 220.

In the example of FIG. 3, the impedance circuit 260 is also arranged internally as a part or component of the MCU 260. Thus, in FIG. 3, the impedance circuit 260 may couple to the crystal either through the first pin 230 or second pin 240 of the MCU 210 to respectively. That is, the impedance circuit 260 can couple to the first port 50a (e.g., through the first pin 230) or the second port 50b (e.g., through the second pin 240) of the crystal 50.

However, as shown in FIG. 3, the capacitors C1 and C2 may remain externally connected to the crystal 50 for the pierce oscillator type configuration.

While in the examples of FIGS. 2 and 3, the crystal 50, in the pierce oscillator type configuration, may be driven by the one or more processors 210 through the second pin 240, in other instances, the crystal 50 may also be driven at the first port 50a through the first pin 230 of the MCU 210. Similarly, in some examples, the excitation signal(s) may be provided to the second port 50b of the crystal via the second pin 240 of the MCU 210. The pins 230 and 240 can be suitable switched to an input or output mode depending on the need or situation, as the case in FIG. 2.

In one or more examples, the devices 200 and 300 can be used to implement a RTC by effectively substituting for one or more functions previously provided by hardware in the real time circuitry 100 of FIG. 1. For example, the MCU 210 in each of the devices 200 and 300 may implement software processes that effectively substitutes or provides similarly functions previously provided by the inverter 60, resistive load 70, and/or the shaper 80. For example, in FIGS. 2 and 3, the devices 200 and 300 have no shaper element for realizing the real-time clock.

Figure 4:
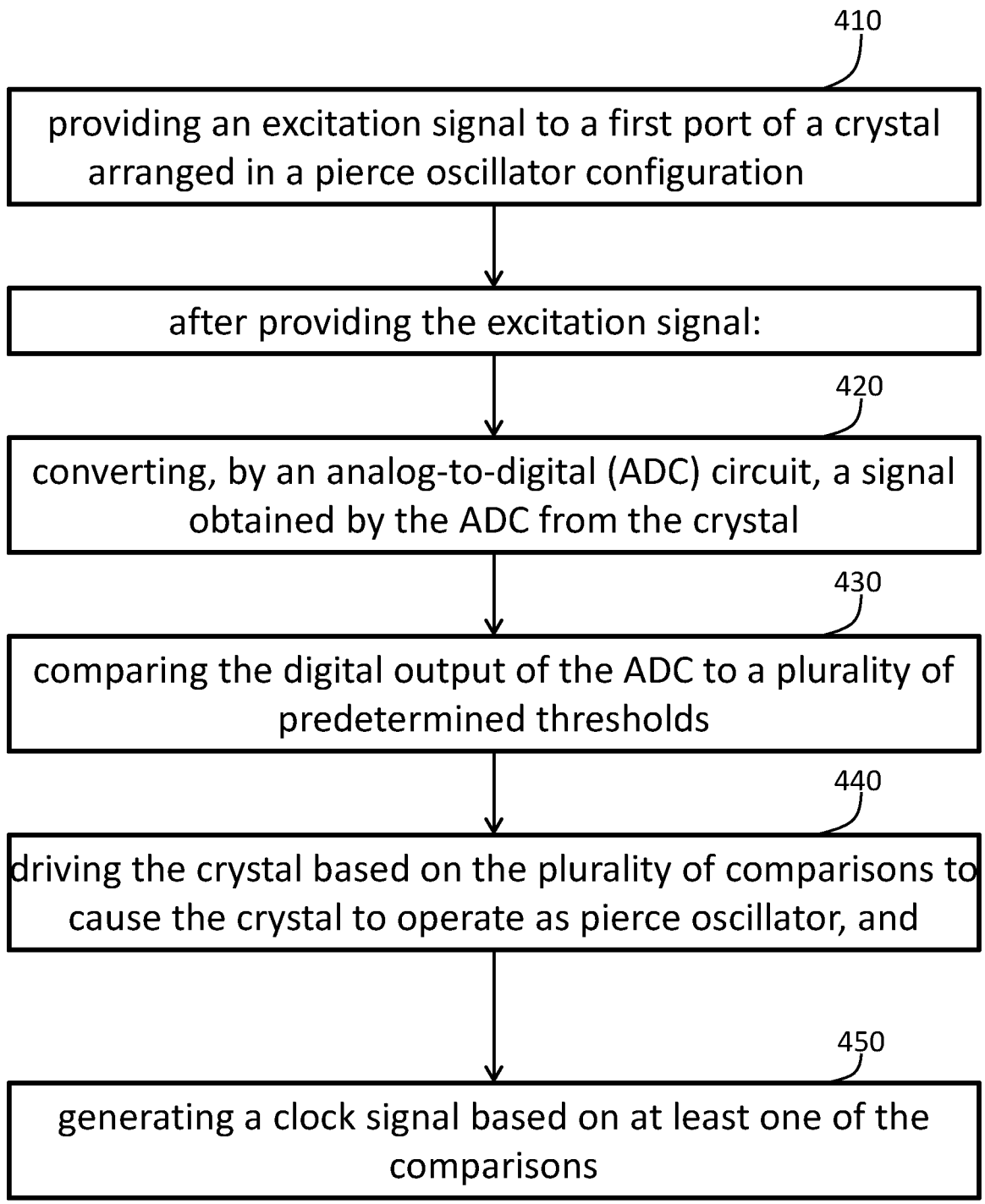
FIG. 4 depicts a method for implementing a real time clock (RTC) according to at least one exemplary embodiment of the present disclosure.

FIG. 4 shows a method 400 for generating a real-time clock (RTC) signal according to at least one exemplary embodiment of the present disclosure. The method may be implemented by the devices 200 and 300 described herein or similarly functioning devices.

The method includes, at 410, providing an excitation signal to a crystal arranged in a pierce oscillator configuration.

The method 400 includes the following, after providing the excitation signal:
- at 420, converting, by an analog-to-digital (ADC) circuit, a signal obtained by the ADC from a port of the crystal at 420;
- at 430, comparing the digital output of the ADC to a plurality of predetermined thresholds;
- at 440, driving a port of the crystal based on the plurality of comparisons to cause the crystal to operate as pierce oscillator, and
- at 450, generating a clock signal based on at least one of the comparisons.

The ADC circuitry 220 can be configured to receive analog input from one or more sources. In the example of FIG. 2, the ADC circuitry 220 may selectively couple to the crystal 50. More specifically the ADC circuitry 220 can couple to the first port 50a of the crystal through the input/output port 230.

For the method 400, comparing the digital output of the ADC circuit to a plurality of thresholds can include comparing the digital output to an upper threshold and comparing the digital output to a lower threshold.

Further, driving the crystal to cause the crystal to operate as a pierce oscillator can include driving the crystal to a low voltage in response to the digital output exceeding the upper threshold and driving the crystal to a high voltage in response to the digital output being lower than the lower threshold.

Further, for the method 400, generating a clock signal can include generating a clock signal and incrementing a counter in response to the digital output being lower than the lower threshold or can include incrementing a counter in response to the digital output being higher than the higher threshold.

For the method 400, again, the excitation signal can be a periodic signal, such as, for example, a sinusoidal, triangle, or square wave signal. Further, the excitation signal can have a frequency or frequency range within five (5) percent of the crystal frequency.

In general, the device or method can be implemented from a standby mode. When the device is awakened, the RTC clock can be produced 10 to 100 times faster than other RTC clocks.

The standard crystal oscillator has a gain of approximately 15, which is not possible to drive MEMS. However, for the devices described herein, it is possible to get a theoretical gain of 5 volts (V) of resolution for the ADC circuit.

Various exemplary embodiments of present disclosure describe devices and methods for generating real-time clock signals. In some embodiment cases, the devices and methods may generate a real-time clock signal continuously for an indefinite duration.

In other cases, a real-time clock signal may be generated as needed by one or more applications or components. When the real-time clock signal is no longer needed, the device generating the real-time clock signal may enter a standby/low power mode or power down.

Figure 5A:
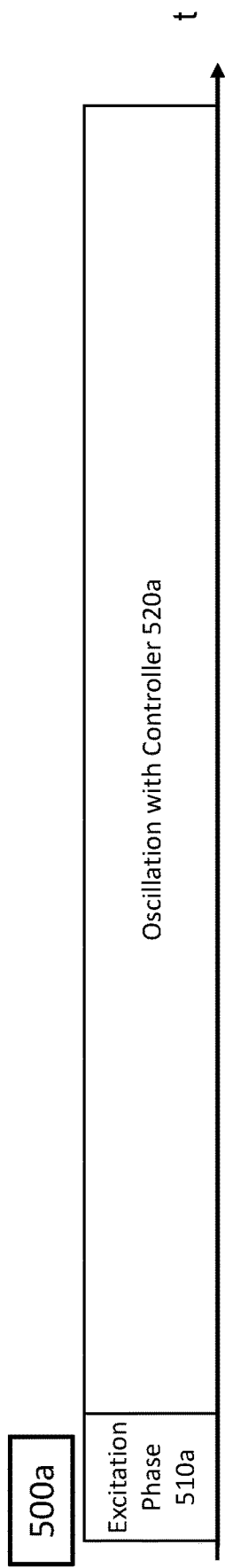
FIGS. 5A-5B is a diagram of device for implementing a real time clock (RTC) for a low power oscillator according to exemplary embodiments of the present disclosure.

FIG. 5A depicts a time diagram 500a showing an example of a real-time clock signal generated over time t. In the example of FIG. 5A, a clock signal is generated or produced for an indefinite amount of time according to methods and devices described in the present disclosure. As indicated in the time diagram, first an excitation phase or energy kicking phase is implemented during the time period 510a. As described, a crystal in a pierce oscillation configuration is energized with an excitation signal during the period 510a.

Next in FIG. 5A, the oscillation phase 520a is implemented. During period 520a the crystal in the pierce oscillation configuration previously energized is driven so that the crystal generates an oscillation signal. The oscillation signal from the crystal can be used to produce a real-time clock signal. The oscillation phase 520b, where also the real time clock signal can be generated, may last for an indefinite amount of time.

In some instances, a real clock signal generated by the devices or methods described may only be needed for limited times. That is, the oscillation signal from the crystal in the pierce oscillation configuration and the real time clock signal may be generated periodically, e.g., at a plurality of distinct time periods. There may be a break or pause in generation of the oscillation signal from the crystal and real time clock signal between the time periods.

Figure 5B:
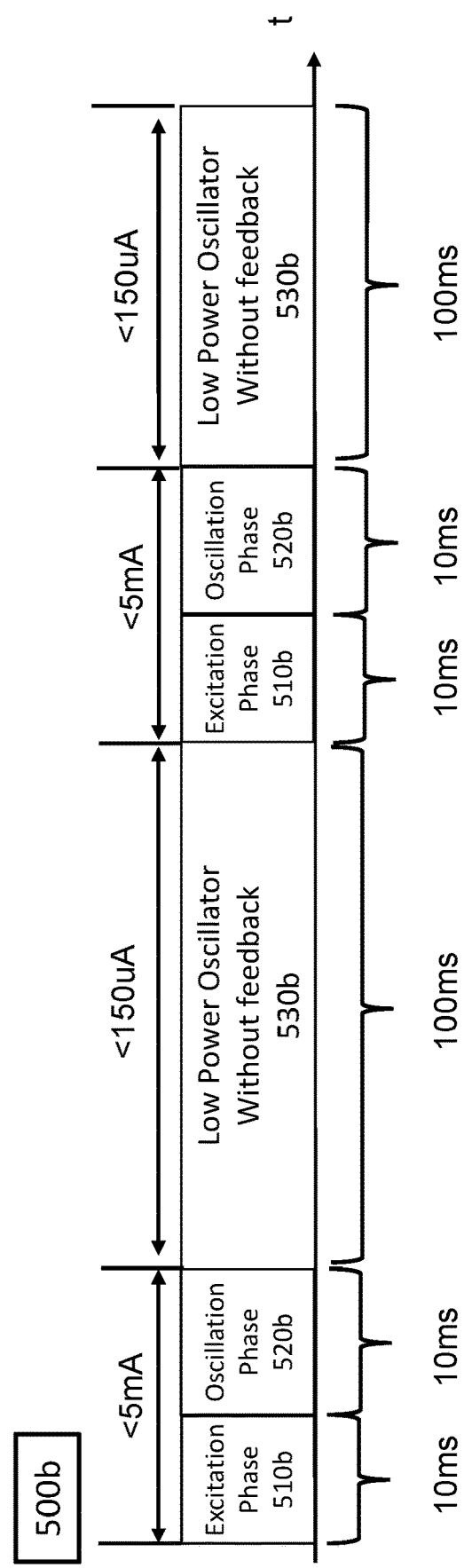

FIG. 5B depicts a time diagram 500b showing an example of a real-time clock signal generated for different periods according to methods and devices described herein over time t. As in FIG. 5A, a device as described herein for generating real-time clocks herein implements an excitation phase or energy kicking at 510b in which a crystal in pierce oscillation configuration is provided with an excitation signal. In the example of FIG. 5B, the excitation phase 510b may last 10 milliseconds.

Next, an oscillation phase 520b is implemented by which the crystal is driven with a controller so that the crystal generates an oscillation signal. This period may last 10 milliseconds. During the oscillation phase, the oscillation signal from the crystal can be used to produce a real-time clock signal. Further, the generated oscillation signal or real-time clock signal produced from the oscillation may be provided to and used by another component or device. In one case, a low power oscillator may be calibrated during the oscillation phase 520b using the real-time clock signal produced by oscillation signal from the crystal.

After the oscillation phase 520b, the device producing real-time clock signal may stop producing the real-time clock signal and may enter into a standby mode or power down. The low power oscillator may continue to operate, now without the real-time clock (calibration) signal during the time period 530b. The time period 530b may last, in one example, for 100 milliseconds.

This time period 530b may a period wherein the low power oscillator can safety operate without drifting too much and becoming too inaccurate. The advantage can be that much less power is used with the low power oscillator, by itself. The low power oscillator may also be operating during the excitation phase 510b and the oscillation phase 520b.

In one example, a low power oscillator phase may use only less than 150 microamps (μA), whereas the device producing the real-time clock signal may use up to but less than 5 milliamps (mA) for the excitation phase 510b and for the oscillation phase 520b.

After a certain period of time, which may be predefined, the low power oscillator may be calibrated again using the real-time clock signal. As shown in FIG. 5B, the device may again generate a real-time clock signal by implementing another excitation phase, 510b1, followed by another oscillation phase 520b1. Again during the oscillation phase 520b1, the low power oscillator can use the generated a real-time clock signal to calibrate.

After calibration/tuning during the oscillation phase 520b1, the low power oscillator may operate again by itself at 530b1, e.g., without the real-time clock signal. During low power oscillation phases 520b, 520b1, etc. the device for generating the real-clock signals (e.g., the MCU) enters a trimming mode by which the device stops or refrains from producing real-time clocks signals. By entering the trimming mode, a higher energy efficiency can be realized as the low power oscillator operating alone consumes less power.

This sequence of actions or events shown in FIG. 5B may repeat indefinitely, for one or more iterations. Namely, the implementation of an excitation phase (e.g., energizing crystal in pierce oscillation configuration), generating real-time clock signals and calibrating low power oscillator, and low power oscillator operating (generating oscillating signals) alone without can repeat.

Figure 6:
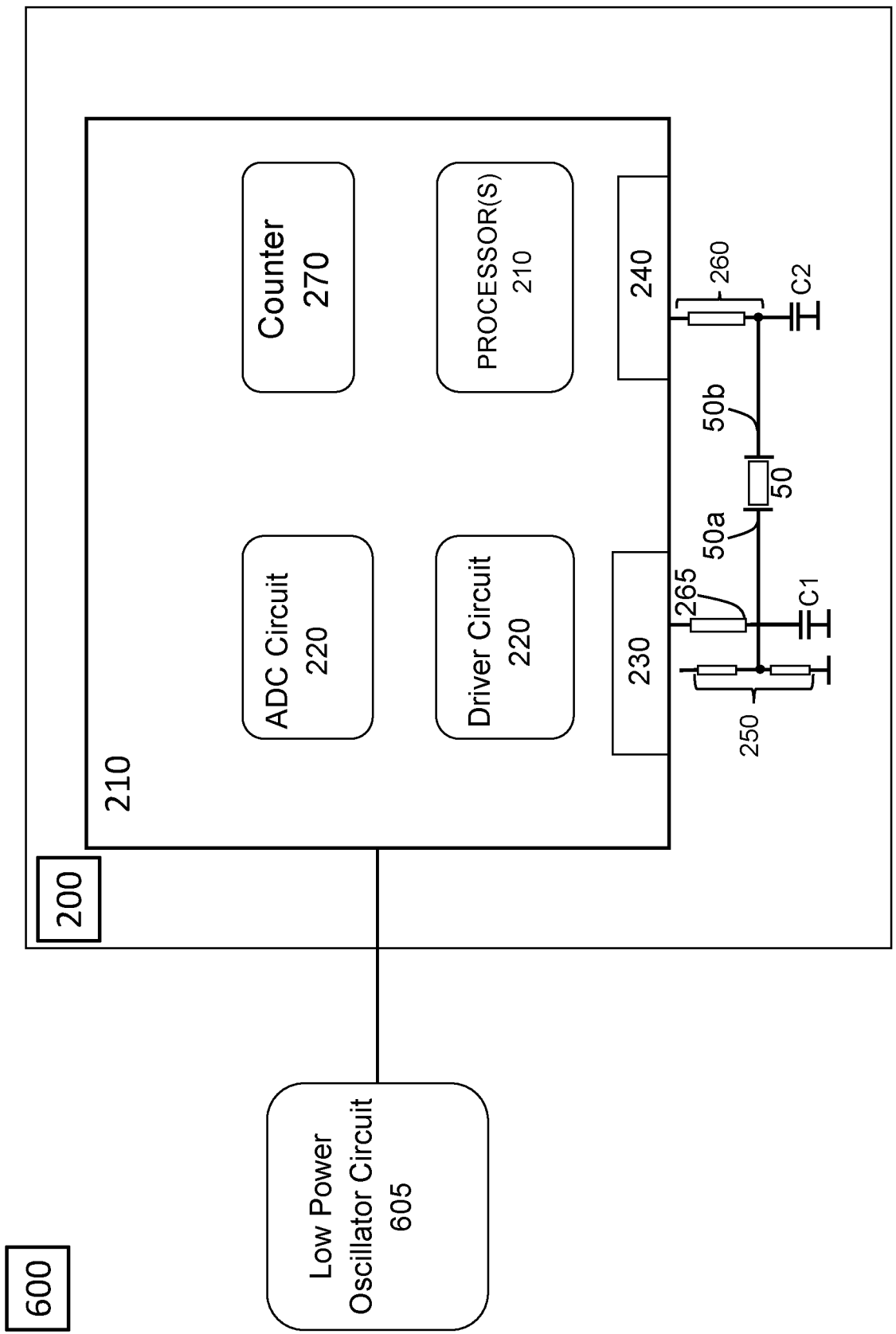
FIG. 6 is a diagram of device for implementing a real time clock (RTC) for a low power oscillator according to exemplary embodiments of the present disclosure.

FIG. 6 shows a diagram of a system 600 for operating a low power oscillator 605 with calibration capabilities. The device 200 for implementing a real-time clock according to described in exemplary embodiments of the present disclosure can be used. The device 200 (also shown in FIG. 2) may generate real-time clock signals as described in exemplary embodiments of the present disclosure. The real-time clock signals generated by the device 200 can be provided for calibrating the low-power oscillator circuit 605. In one example, the low power oscillator may be configured to produce 70 kHz oscillation signal, but can drift and become somewhat inaccurate over time. The real-time clocks signals can be used by the low power oscillator to recalibrate.

As described in context of FIG. 5B, the device 200 of FIG. 6 may be active or powered on for predefined time periods for generating and providing real-time signals, and then may enter a trimming mode, by which the device 200 is no longer active and may enter a standby or low power mode. The low-power oscillator 605 may operate during all time periods including operate without the device 200 being active (e.g., phase 530b). While in FIG. 6 shows the device 200 to be used to generate real-time clock signals for calibration purposes, other devices may be used such as the device 300, as one example.

The following examples pertain to further aspects of this disclosure:

Example 1 is a device including at least one processor, and an analog-to-digital (ADC) circuit, wherein the at least one processor is configured to generate an excitation signal and provide the excitation signal to a crystal in a pierce oscillation configuration, wherein after providing the excitation signal, the ADC circuit is configured to obtain as input a signal output from the crystal and convert the signal to a digital output; the at least one processor is configured to compare the digital output of the ADC circuit to a plurality of thresholds and based on the comparisons is further configured to drive the crystal to cause the crystal to operate as a pierce oscillator and to generate a clock signal from at least of one of the comparisons.

Example 2 is the subject matter of Example 1, which may further include a first pin capable of operating in an input mode and an output mode and coupled to the ADC circuit, wherein the ADC circuit is configured to obtain the signal output from the crystal via the first pin.

Example 3 is the subject matter of Example 2, wherein the at least one processor can be configured to provide the generated excitation signal via the first pin or via the second pin to the crystal in a pierce oscillation configuration.

Example 4 is the subject matter of any of Examples 1 to 3, wherein the at least one processor configured to compare the digital output of the ADC circuit to a plurality of thresholds can include the at least one processor configured to compare the digital output to a predetermined upper threshold and to compare the digital output to a predetermined lower threshold.

Example 5 is the subject matter of Example 4, wherein the at least one processor configured to drive the crystal to operate the crystal as a pierce oscillator can include the at least one processor configured to drive the crystal to a low voltage value when the digital output exceeds the predetermined upper threshold and to drive the crystal to a high voltage when the digital output is lower than the predetermined lower threshold.

Example 6 is the subject matter of Example 4 or 5, wherein the at least one processor can be configured to generate a clock signal comprises to generate a clock signal and increment a counter in response to the digital output being lower than the predetermined lower threshold.

Example 7 is the subject matter of Example 4 or 5, wherein the at least one processor can be configured to generate a clock signal comprises to generate a clock signal and increment a counter in response to the digital output being higher than the predetermined upper threshold.

Example 8 is the subject matter of any of Examples 2 to 7, which can further include a second pin, wherein the at least one processor is configured is further configured to drive the crystal to operate as a pierce oscillator through the second pin.

Example 9 is the subject matter of Example 8, wherein the at least one processor can be configured to provide the generated excitation signal via the second pin to the crystal in a pierce oscillation configuration.

Example 10 is the subject matter of Example 8 or 9, wherein the first pin can be coupled to a first port of the crystal and the second pin can be coupled to a second port of the crystal.

Example 11 is the subject matter of any of Examples 2 to 10, which may further include a biasing circuit configured to provide a bias voltage, wherein the ADC circuit is configured to couple to the biasing circuit so as to obtain the bias voltage as a comparison voltage for the ADC circuit.

Example 12 is the subject matter of Example 11, wherein the ADC circuit can be configured to couple to the biasing circuit via the first pin.

Example 13 is the subject matter of any of Examples 8 to 12, which may further include wherein the biasing circuit is further configured to couple to the crystal via the first pin.

Example 14 is the subject matter of any of Examples 1 to 13, which may further include an impedance circuit which can be configured to provide an impedance or ohmic bias the crystal, wherein the at least one processor is configured to drive the crystal using the impedance circuit.

Example 15 is the subject matter of Example 14, wherein the impedance circuit can include a push pull circuit and a switchable resistor.

Example 16 is the subject matter of Example 15, wherein the impedance circuit can include an open drain circuit with a pull-up resistor.

Example 17 is the subject matter of Example 14, wherein the impedance circuit can include a pulse-width modulation (PWM) controlled resistor.

Example 18 is the subject matter of any of Examples 1 to 17, wherein the device can be or include a controller or microcontroller.

Example 19 is the subject matter of any of Examples 1 to 18, wherein the excitation signal can be a periodic signal.

Example 20 is the subject matter of Example 19, wherein the periodic signal is a sinusoidal, triangle, or square wave signal.

Example 21 is the subject matter of any of Examples 1 to 20, wherein the excitation signal can have a frequency within five (5) percent of a crystal frequency of the crystal.

Example 22 is the subject matter of any of Examples 1 to 21, wherein the excitation signal can have a frequency within two (2) percent of a crystal frequency of the crystal.

Example 23 is the subject matter of any of Examples 1 to 22, which may further include a driver circuit.

Example 24 is the subject matter of Example 23, wherein the at least one processor configured to generate an excitation signal can include the at least one processor to cause the driver circuit to generate and provide the excitation signal to the crystal in the pierce oscillation configuration.

Example 25 is the subject matter of Example 23, wherein the at least one processor configured to drive the crystal to operate as a pierce oscillator can include the at least one processor to cause the driver circuit to drive the crystal in the pierce oscillation configuration.

Example 26 is the subject matter of any of Examples 1 to 25, wherein the clock signal can be provided to a low power oscillator.

Example 27 is the subject matter of Example 26, wherein for one or more time periods, the at least one processor can be configured to generate the excitation signal and provide the excitation signal to the crystal in a pierce oscillation configuration at one or more time periods, wherein the ADC circuit can be configured to obtain as input the signal output from the crystal and convert the signal to a digital output after the provision of the excitation signal to the crystal; and the at least one processor is configured to compare the digital output of the ADC circuit to a plurality of thresholds and based on the comparisons is further configured to drive the crystal to cause the crystal to operate as a pierce oscillator and to generate the clock signal from at least of one of the comparisons, and provide the clock signal to the low power oscillator.

Example 28 is the subject matter of Example 27, wherein between the one or more time periods, the device is non-active and refrains from generating the clock signal.

Example 1A includes a device including: at least one processor, a first pin, a second pin, and an analog-to-digital (ADC) circuit coupled to the first pin; an oscillator circuit comprising a crystal having a first port and a second port, a first capacitor coupled to the first port of the crystal is coupled to the first pin and a second capacitor coupled to the second port of the crystal;

wherein the at least one processor is configured to generate an excitation signal and provide the excitation signal to the crystal via the first pin or second pin; wherein after providing the excitation signal, the ADC circuit is configured to obtain as input a signal from the first port of the crystal via the first pin and convert the signal to a digital output; the at least one processor is configured to compare the digital output of the ADC circuit to a plurality of thresholds and based on the comparisons is further configured to drive the second port of the crystal to cause the crystal to operate as a pierce oscillator and generate a clock signal from at least of one of the comparisons.

Example 2A is the subject matter of Example 1A, wherein the at least one processor configured to compare the digital output of the ADC circuit to a plurality of thresholds can include comparing the digital output to a predetermined upper threshold and comparing the digital output to a predetermined lower threshold.

Example 3A is the subject matter Example 2A, wherein the at least one processor configured to drive the second port of the crystal to operate the crystal as a pierce oscillator can include to drive the second port to a low voltage value when the digital output exceeds the predetermined upper threshold and to drive the second port to a high voltage when the digital output is lower than the predetermined lower threshold.

Example 4A is the subject matter of any of Examples 1A to 3A, wherein the at least one processor configured to generate a clock signal can include the at least one processor to generate a clock signal and increment a counter in response to the digital output being lower than the predetermined lower threshold.

Example 5A is the subject matter of any of Examples 1A to 4A, wherein the at least one processor configured to generate a clock signal can include the at least one processor to generate a clock signal and increment a counter in response to the digital output being higher than the predetermined upper threshold.

Example 6A is the subject matter of any of Examples 1A to 5A, which can further include a biasing circuit coupled to a first port of the crystal and further coupled to the ADC circuit, wherein the ADC circuit is configured to obtain the bias voltage for use as a comparison voltage.

Example 7A is the subject matter of any of Examples 1A to 6A, wherein the biasing circuit can include a resistive divider or a current sink circuit that includes a voltage divider.

Example 8A is the subject matter Example 6A, which may further include an impedance circuit configured to couple and bias the crystal at the second port, wherein the at least one processor is configured to drive the crystal using the impedance circuit.

Example 9A is the subject matter of Example 8A, wherein the impedance circuit can include a resistive load between the second port of the crystal and the second pin.

Example 10A is the subject matter of Example 8A, wherein the impedance circuit can include a push pull circuit and a switchable resistor.

Example 11A is the subject matter of Example 8A, wherein the impedance circuit can include a pulse-width modulation (PWM) controlled resistor.

Example 12A is the subject matter of Example 8A, which may further include a controller, wherein the controller can include the at least one processor, the ADC circuit, and the first and second pins.

Example 13A is the subject matter of Example 12A, wherein the controller further can include the biasing circuit and/or the impedance circuit.

Example 14A is the subject matter of any of Examples 1A to 13A, wherein the ADC circuit can be configured to periodically convert the signal to digital output.

Example 15A is the subject matter of any of Examples 1A to 13A, wherein the ADC circuit can be configured to continuously convert the signal to digital output.

Example 16A is the subject matter of any of Examples 1A to 15A, wherein the first pin is capable of operating in an input mode and an output mode, wherein when the first pin is in the output mode the at least one processor provides the excitation signal to the first port of the crystal, and wherein the ADC is configured to obtain the signal from the first port of the crystal when the first pin is the input mode.

Example 17A is the subject matter of any of Examples 1A to 16A, wherein the excitation signal can be a periodic signal.

Example 18A is the subject matter of any of Examples 1A to 17A, wherein the excitation signal can be a sinusoidal, triangle, or square wave signal.

Example 19A is the subject matter of any of Examples 1A to 18A, wherein the excitation signal can have a frequency within five (5) percent of a crystal frequency of the crystal.

Example 20A is the subject matter of any of Examples 1A to 19A, wherein the excitation signal can have a frequency within two (2) percent of a crystal frequency of the crystal.

Example 21A is the subject matter of any of Examples 1A to 20A, which may further include a driver circuit.

Example 22A is the subject matter of Example 21A, wherein the at least one processor configured to generate an excitation signal can include the at least one processor to cause the driver circuit to generate and provide the excitation signal to the crystal in the pierce oscillation configuration.

Example 23A is the subject matter of Example 21A, wherein the at least one processor configured to drive the crystal to operate as a pierce oscillator can include the at least one processor to cause the driver to drive the crystal in the pierce oscillation configuration.

Example 24A is the subject matter of any of Examples 1A to 23A, which may further include a low power oscillator configured to obtain the generated clock signal and calibrate using the clock signal.

Example 25A is the subject matter of Example 24A, wherein for one or more time periods, the at least one processor configured to generate the excitation signal and provide the excitation signal to the crystal in a pierce oscillation configuration at one or more time periods, the ADC circuit is configured to obtain as input the signal output from the crystal and convert the signal to a digital output after the provision of the excitation signal to the crystal; the at least one processor is configured to compare the digital output of the ADC circuit to a plurality of thresholds and based on the comparisons is further configured to drive the crystal to cause the crystal to operate as a pierce oscillator and to generate the clock signal from at least one of the comparisons, the low power oscillator is configured to obtain the clock signal and perform a calibration using the clock signal, the low power oscillator configured to generate an oscillation signal after the calibration.

Example 26A is the subject matter of Example 25A, wherein the low power oscillator is configured to generate an oscillation signal after the calibration oscillation signals without obtaining the clock signal.

Example 1B is method including: providing an excitation signal to a crystal arranged in a pierce oscillator configuration;
after providing the excitation signal,
converting, by an analog-to-digital (ADC) circuit, a signal obtained by the ADC from the crystal; comparing the digital output of the ADC to a plurality of predetermined thresholds; driving the crystal based on the plurality of comparisons to cause the crystal to operate as pierce oscillator, and generating a clock signal based on at least one of the comparisons.

Example 2B is the subject matter of Example 1B, wherein comparing the digital output of the ADC circuit to a plurality of thresholds includes comparing the digital output to a predetermined upper threshold and comparing the digital output to a predetermined lower threshold.

Example 3B is the subject matter of Example 2B, wherein driving the crystal to cause the crystal to operate as a pierce oscillator includes driving the crystal to a low voltage in response to the digital output exceeding the predetermined upper threshold and driving the crystal to a high voltage in response to the digital output being lower than the predetermined lower threshold.

Example 4B is the subject matter of any of Examples 1B to 3B, wherein generating a clock signal can include generating a clock signal and incrementing a counter in response to the digital output being lower than the predetermined lower threshold.

Example 5B is the subject matter of any of Examples 1B to 4B, wherein the excitation signal can be a periodic signal.

Example 6B is the subject matter of any of Examples 1B to 5B, wherein the excitation signal can be a sinusoidal, triangle, or square wave signal.

Example 7B is the subject matter of any of Examples 1B to 6B, wherein the excitation signal can have a frequency within five (5) percent of the crystal frequency.

Example 8B is the subject matter of any of Examples 1B to 6B, which may further include providing the clock signal to a low power oscillator.

Example 9B is the subject matter of Example 8B, which may further include calibrating the low power oscillator using the provided clock signal.

Example 10B is the subject matter of Example 9B, which may further include generating an oscillating signal from the low power oscillator after the calibration.

Example 11B is the subject matter of Example 10B, wherein the during the generation of the oscillating signal from the lower power oscillator, no signal is no clock signal is generated.

Example 1C is a non-transitory computer readable medium comprising instructions when executed by at least one processor (e.g., of a microcontroller) cause the at least one processor to carry methods described in connections in the examples above or in the exemplary embodiments of the present disclosure.

It should be noted that one or more of the features of any of the examples above may be suitably or appropriately combined with any one of the other examples and that embodiments herein may be combined with each other.

The foregoing description has been given by way of example only and it will be appreciated by those skilled in the art that modifications may be made without departing from the broader spirit or scope of the invention as set forth in the claims. The specification and drawings are therefore to be regarded in an illustrative sense rather than a restrictive sense.

The scope of the disclosure is thus indicated by the appended claims and all changes which come within the meaning and range of equivalency of the claims are therefore intended to be embraced.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A device comprising:
at least one processor, a first pin, a second pin, and an analog-to-digital (ADC) circuit coupled to the first pin;
an oscillator circuit comprising a crystal having a first port and a second port, a first capacitor coupled to the first port of the crystal is coupled to the first pin and a second capacitor coupled to the second port of the crystal;
wherein the at least one processor is configured to generate an excitation signal and provide the excitation signal to the crystal via the first pin or second pin;
wherein after providing the excitation signal,
the ADC circuit is configured to obtain as input a signal from the first port of the crystal via the first pin and convert the signal to a digital output;
the at least one processor is configured to compare the digital output of the ADC circuit to a plurality of thresholds and based on the comparisons is further configured to drive the second port of the crystal to cause the crystal to operate as a pierce oscillator and generate a clock signal from at least of one of the comparisons.

2. The device of claim 1,
wherein the at least one processor configured to compare the digital output of the ADC circuit to a plurality of thresholds comprises comparing the digital output to a predetermined upper threshold and comparing the digital output to a predetermined lower threshold.

3. The device of claim 2,
wherein the at least one processor configured to drive the second port of the crystal to operate the crystal as a pierce oscillator comprises to drive the second port to a low voltage value when the digital output exceeds the predetermined upper threshold and to drive the second port to a high voltage when the digital output is lower than the predetermined lower threshold.

4. The device of claim 1, further comprising:
a biasing circuit coupled to a first port of the crystal and further coupled to the ADC circuit, wherein the ADC circuit is configured to obtain the bias voltage for use as a comparison voltage.

5. The device of claim 4, further comprising:
an impedance circuit configured to couple and bias the crystal at the second port, wherein the at least one processor is configured to drive the crystal using the impedance circuit.

6. The device of claim 5, further comprising
a controller, wherein the controller comprises the at least one processor, the ADC circuit, and the first and second pins.

7. The device of claim 1,
wherein the first pin is capable of operating in an input mode and an output mode, wherein when the first pin is in the output mode the at least one processor provides the excitation signal to the first port of the crystal, and wherein the ADC is configured to obtain the signal from the first port of the crystal when the first pin is the input mode.

8. The device of claim 1, further comprising:
a low power oscillator configured to obtain the generated clock signal and calibrate using the clock signal.

9. The device of claim 8,
wherein for one or more time periods,
the at least one processor is configured to generate the excitation signal and provide the excitation signal to the crystal in a pierce oscillation configuration at one or more time periods,
the ADC circuit is configured to obtain as input the signal output from the crystal and convert the signal to a digital output after the provision of the excitation signal to the crystal;
the at least one processor is configured to compare the digital output of the ADC circuit to a plurality of thresholds and based on the comparisons is further configured to drive the crystal to cause the crystal to operate as a pierce oscillator and to generate the clock signal from at least of one of the comparisons,
the low power oscillator is configured to obtain the clock signal and perform a calibration using the clock signal,
the low power oscillator configured to generate an oscillation signal after the calibration.

10. The device of claim 9,
wherein the low power oscillator is configured to generate an oscillation signal after the calibration oscillation signals without obtaining the clock signal.

11. A device comprising:
at least one processor, and
an analog-to-digital (ADC) circuit,
wherein the at least one processor is configured to generate an excitation signal and provide the excitation signal to a crystal in a pierce oscillation configuration,
wherein after providing the excitation signal,
the ADC circuit is configured to obtain as input a signal output from the crystal and convert the signal to a digital output;
the at least one processor is configured to compare the digital output of the ADC circuit to a plurality of thresholds and based on the comparisons is further configured to drive the crystal to cause the crystal to operate as a pierce oscillator and to generate a clock signal from at least of one of the comparisons.

12. The device of claim 11, further comprising:
a first pin capable of operating in an input mode and an output mode and coupled to the ADC circuit, wherein the ADC circuit is configured to obtain the signal output from the crystal via the first pin.

13. The device of claim 12,
wherein the at least one processor is configured to provide the generated excitation signal via the first pin or via the second pin to the crystal in a pierce oscillation configuration.

14. The device of claim 11, wherein the excitation signal is a periodic signal.

15. The device of claim 1, wherein the excitation signal has a frequency within five (5) percent of a crystal frequency of the crystal.

16. The device of claim 11, wherein the excitation signal has a frequency within five (5) percent of a crystal frequency of the crystal.

17. The device of claim 11, wherein the excitation signal has a frequency within two (2) percent of a crystal frequency of the crystal.

18. The device of claim 1, further comprising:
a driver circuit, wherein the at least one processor configured to generate an excitation signal comprises the at least one processor to cause the driver circuit to generate and provide the excitation signal to the crystal in the pierce oscillation configuration.

19. A method comprising:
providing an excitation signal to a crystal arranged in a pierce oscillator configuration;
wherein after providing the excitation signal, the method further comprises:
converting, by an analog-to-digital (ADC) circuit, a signal obtained by the ADC from the crystal;
comparing the digital output of the ADC to a plurality of predetermined thresholds;
driving the crystal based on the plurality of comparisons to cause the crystal to operate as pierce oscillator, and
generating a clock signal based on at least one of the comparisons.

20. The method of claim 19,
wherein comparing the digital output of the ADC circuit to a plurality of thresholds comprises comparing the digital output to a predetermined upper threshold and comparing the digital output to a predetermined lower threshold, and
wherein driving the crystal to cause the crystal to operate as a pierce oscillator comprises driving the crystal to a low voltage in response to the digital output exceeding the predetermined upper threshold and driving the crystal to a high voltage in response to the digital output being lower than the predetermined lower threshold.

* * * * *